UNITED STATES PATENT OFFICE.

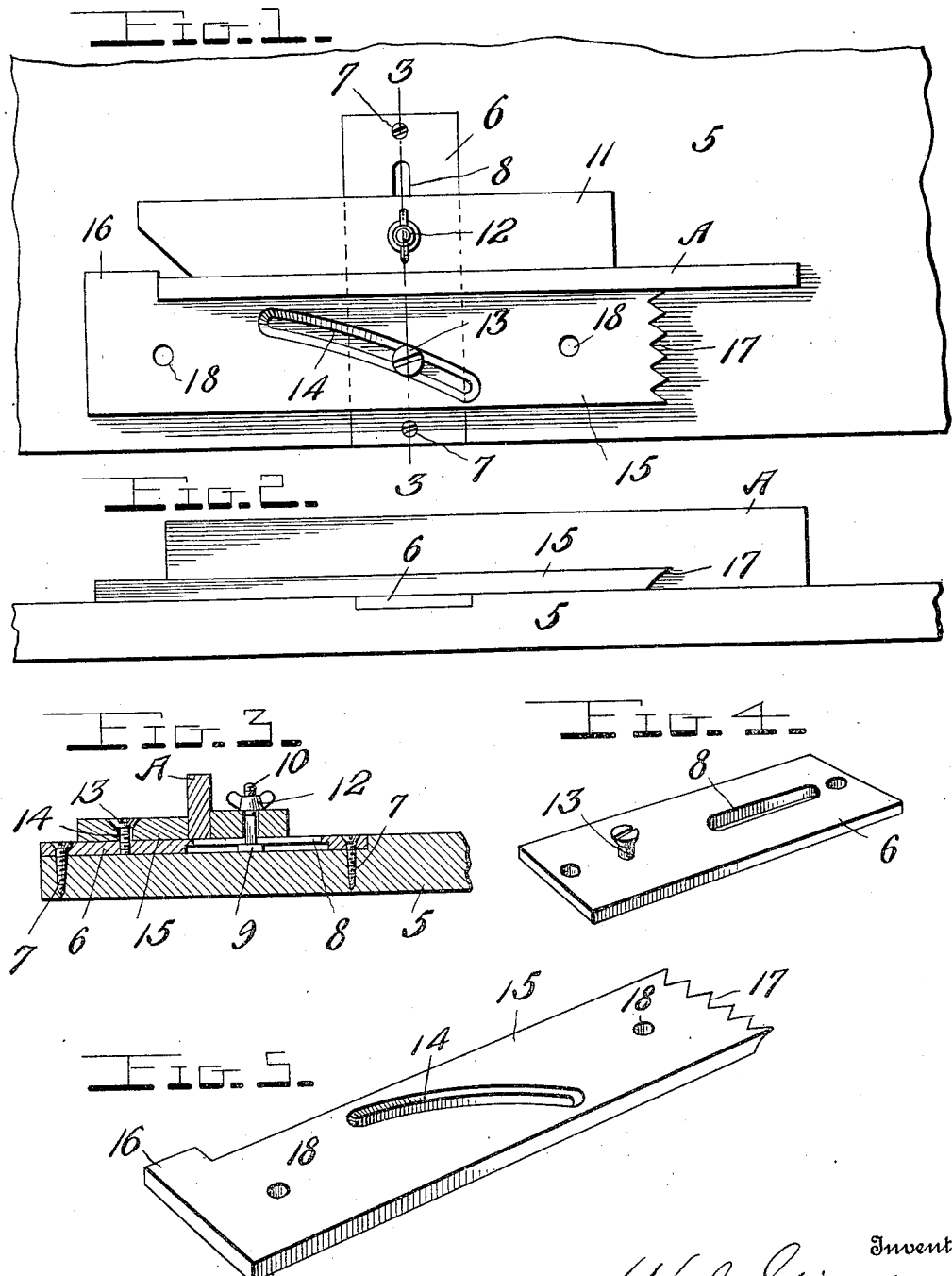

WILLIAM J. STIVER, OF GROVE, OKLAHOMA.

BENCH-DOG.

960,053. Specification of Letters Patent. Patented May 31, 1910.

Application filed November 13, 1909. Serial No. 527,931.

*To all whom it may concern:*

Be it known that I, WILLIAM J. STIVER, a citizen of the United States, residing at Grove, in the county of Delaware and State of Oklahoma, have invented certain new and useful Improvements in Bench-Dogs, of which the following is a specification, reference being had to the accompanying drawings.

This invention relates to certain new and useful improvements in bench dogs and has for its object to provide a device of this character which will securely hold the work to be operated upon on the bench.

Another object is to provide a very simple device which may be constructed at a minimum expense and wherein the work is clamped without the aid of screws or other adjustable elements.

With these and other objects in view, the invention consists of the novel construction, combination and arrangement of parts hereinafter fully described and claimed, and illustrated in the accompanying drawings, in which—

Figure 1 is a top plan view of a bench dog constructed in accordance with my invention; Fig. 2 is a side elevation thereof; Fig. 3 is a section taken on the line 3—3 of Fig. 1; Fig. 4 is a detail perspective view of the attaching plate; and Fig. 5 is a similar view of the slidable clamping member.

Referring to the drawings 5 indicates a carpenter's work bench, and 6 the clamping plate of my improved dog which is countersunk in the bench and secured by means of the screw 7. This plate would preferably be formed of steel and is provided adjacent to its inner end with a longitudinal slot 8. The width of this slot on the underside of the plate is increased to accommodate the head 9 of a bolt 10. The shank of this bolt is square in cross section and extends through the slot in the plate and through a guide block 11. That portion of the bolt which extends above the guide block is cylindrical and provided with screw threads to receive a wing nut 12 by means of which the guide member may be secured in its adjusted position upon the bench. The attaching plate 6 also carries a screw or stud 13, which extends through an arcuate slot 14 in the slidable clamping member 15. The upper edge of this slot is outwardly flared and the head of the screw is disposed therein flush with the surface of the clamping member. The forward end of the member 15 is formed with an extension 16 on its inner edge with which the forward end of the piece of work A to be operated upon engages. The rear end of the clamping member 15 is serrated as shown at 17 the purpose of which will hereinafter appear. Openings 18 are also provided adjacent to the opposite ends of the member 15 in which a pin may be inserted for moving the clamping member to release the work.

In the operation of the device, the member 11 is moved over the surface of the work bench until the same is properly spaced from the inner edge of the clamping member 15, and the nut 12 is adjusted to securely hold the block 11 in such position. The plank or other article upon which the work is to be performed is disposed between the clamping member 15 and the block 11, and shoved forwardly until its end engages the extension 16. The member 15 will then be moved forwardly and inwardly, the screw stud 13 acting as a guide for such movement. It will be obvious that when sufficient pressure is exerted upon the work, that the edges of the clamping member and the guide block 11 will bind upon the opposite sides thereof and rigidly secure the same in position. The work may also be instantly released when desired by forcing the same rearwardly from between the edges of the spacing member and guide block. In the event that a piece of work of greater width is to be operated upon than can be placed between the edges of the member 15 and block 11, a comparatively narrow piece of plank is clamped between the members and the piece to be operated upon is disposed against the same and against the rear serrated end of the clamping member 15. Thus the work will be almost as securely held in position as though it were clamped on the bench. Except upon unusual occasions, however, by moving the guide block 11 upon the surface of the bench and clamping the nut 12 thereon, the space may be regulated to receive various widths of lumber and rigidly clamp the same in position.

From the foregoing it will be seen that I have provided a bench dog which is extremely effective in its operation and one whereby the work will be very quickly and securely clamped in position. It will be further observed that the necessity for manipulating a number of adjusting screws to secure the work in position is eliminated, and the device above described combines the greatest simplicity with a high degree of efficiency and durability. While I have shown and described what I believe to be the preferred embodiment of the invention, it will be obvious that numerous minor modifications may be resorted to without departing from the spirit or sacrificing any of the advantages of the invention.

Having thus described the invention, what is claimed is:

A device of the character described comprising an attaching plate secured to a work bench, a guide block disposed upon said plate and extending at right angles thereto, a bolt positioned through a slot in said plate and extending through said guide block, said bolt having a head on its lower end to retain the same in the slot, an adjusting nut threaded upon the upper end of said bolt to secure the block in position on the bench, a clamping member arranged upon said attaching plate, a stud secured in said plate extending through an arcuate slot in the clamping member, said clamping member and guide block having their opposed edges arranged in spaced longitudinal parallel relation, an extension formed on the forward end of said clamping member and adapted to be engaged by a piece of work inserted between the opposed longitudinal edges of said block and clamping member, whereby the forward movement of the work will cause the clamping member to move forwardly and inwardly upon the bench, said members maintaining their longitudinal parallel relation and clamping the work between their opposed longitudinal edges.

In testimony whereof I hereunto affix my signature in the presence of two witnesses.

WILLIAM J. STIVER.

Witnesses:
F. H. ROMANS,
J. W. OAKES, Jr.